(12) United States Patent
Henderson et al.

(10) Patent No.: US 12,162,377 B2
(45) Date of Patent: Dec. 10, 2024

(54) SYSTEM AND A METHOD FOR CONTROLLING A WHEEL OF A VEHICLE

(71) Applicant: VOLVO TRUCK CORPORATION, Gothenburg (SE)

(72) Inventors: Leon Henderson, Härryda (SE); Leo Laine, Härryda (SE); Adithya Arikere, Gothenburg (SE); Sidhant Ray, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 331 days.

(21) Appl. No.: 17/456,418

(22) Filed: Nov. 24, 2021

(65) Prior Publication Data
US 2022/0185117 A1 Jun. 16, 2022

(30) Foreign Application Priority Data

Dec. 9, 2020 (EP) .................................. 20212636

(51) Int. Cl.
*B60L 7/26* (2006.01)
*B60L 15/20* (2006.01)
*B60L 15/32* (2006.01)

(52) U.S. Cl.
CPC ............ *B60L 7/26* (2013.01); *B60L 15/2009* (2013.01); *B60L 15/2036* (2013.01); *B60L 15/32* (2013.01); *B60L 2240/423* (2013.01)

(58) Field of Classification Search
CPC .... B60L 7/26; B60L 15/2009; B60L 15/2036; B60L 2240/423; B60L 15/20; B60W 2520/28; B60W 2520/30; F16D 61/00
See application file for complete search history.

(56) References Cited

U.S. PATENT DOCUMENTS

| | | | | |
|---|---|---|---|---|
| 2005/0060076 A1* | 3/2005 | Phillips | ................... | B60L 8/003 701/53 |
| 2013/0296126 A1* | 11/2013 | Gibson | ................... | B60L 50/16 903/902 |

(Continued)

FOREIGN PATENT DOCUMENTS

| | | |
|---|---|---|
| CN | 110001610 A | 7/2019 |
| CN | 110539647 A | 12/2019 |

(Continued)

OTHER PUBLICATIONS

European Search Report dated May 11, 2021 in corresponding European Patent Application No. 20212636.3, 8 pages.

(Continued)

*Primary Examiner* — Stephen Holwerda
*Assistant Examiner* — Dairon Estevez
(74) *Attorney, Agent, or Firm* — Venable LLP; Jeffri A. Kaminski (57) ABSTRACT

A comprises a vehicle control unit, VCU, and a control module, CM, configured to control the torque actuators. The VCU is configured to send to the CM a parameter request and a desired recuperation power or a desired parameter split ratio. If the CM determines that these are conflicting targets, then based on one or more predefined criteria, the CM will apply a parameter value and allocate a recuperation power or a parameter split ratio such that the applied parameter value is different from the requested one and/or the allocated recuperation power or parameter split ratio is different from the desired one. A method of controlling a wheel is also disclosed.

23 Claims, 5 Drawing Sheets

(56) References Cited

U.S. PATENT DOCUMENTS

2014/0257664 A1\* 9/2014 Arbitmann .......... B60T 8/17551
    701/71
2020/0216058 A1\* 7/2020 Aggoune .......... B60W 60/0023

FOREIGN PATENT DOCUMENTS

| DE | 102005000988 A1 | 7/2006 | |
|----|----|----|----|
| DE | 102014003992 B4 | 1/2016 | |
| WO | WO-2010012837 A1 \* | 2/2010 | .............. B60L 15/20 |
| WO | 2013045584 A1 | 4/2013 | |

OTHER PUBLICATIONS

European Communication pursuant to Article 94(3) EPC dated Jan. 26, 2024 in corresponding European Patent Application No. 20212636.3, 6 pages.

\* cited by examiner

SYSTEM AND A METHOD FOR CONTROLLING A WHEEL OF A VEHICLE

TECHNICAL FIELD

The present disclosure relates to a system for controlling a wheel. The present disclosure also relates to a vehicle comprising such a system. The present disclosure further relates to a method for controlling a wheel of a vehicle. The present disclosure additionally relates to a computer program, a computer readable medium and a control module configured to perform the method.

The invention can be applied in heavy-duty vehicles, such as trucks, buses and construction equipment. Although the invention will be described with respect to cargo transport vehicles such as semi-trailer vehicles and trucks, the invention is not restricted to this particular vehicle, but may also be used in other vehicles such as cars.

BACKGROUND

In the vehicle industry of today, there is generally much effort put into the development of electric propulsion of the vehicle. A vehicle may, for instance, be provided with an electric motor which drives all wheels. However, there are also vehicles in which the wheels are driven by individual electric motors.

CN110539647A discloses such a vehicle, which comprises individual electric motors and individual service brakes at each wheel end. The electric motors may be operated to provide regenerative braking torque. A central controller sends required torque requests to each electric motor and to each wheel brake at each wheel end. The central controller allocates torque requests individually to all torque actuators. Thus, it sends four torque requests to the electric machines and four torque requests to the service brakes. In other words the central controller must consider both the service brake actuator and the electric motor actuator as separate actuators at each wheel. It goes without saying that it would be desirable to make the task of the central controller simpler.

In particular it would be desirable to provide a system and a method with improved control of a wheel associated with at least two actuators for providing a torque to the wheel.

SUMMARY

An object of the invention is to provide a system and a method which at least partly alleviate the drawbacks of the prior art. The object is achieved by a system and a method as defined in the accompanying independent claims.

The present inventive concept is based on the realization that the torque allocation decision may be cascaded from a primary controller to individual secondary controllers which control at least two individual actuators associated with each wheel. In particular, the inventors have realized that the primary controller may give a rough idea of a desired parameter split (such as a torque split or a power split) or of how much regenerative braking is desired, but leaving the final allocation between the actuators for each secondary controller to decide.

According to at least a first aspect of the present disclosure, there is provided a system for controlling a wheel of a vehicle provided with at least two torque actuators for providing a torque to the wheel, the system comprising:
 a vehicle control unit, VCU, and
 a control module, CM, configured to control the torque actuators,
wherein the VCU is configured to send to the CM:
 a first signal containing a first target in the form of a requested parameter value of at least one parameter to be controlled by means of the torque actuators with respect to the wheel, and
 a second signal containing a second target in the form of a desired recuperation power or in the form of a desired parameter split ratio between the torque actuators,
wherein the CM is configured to:
 determine if there is a conflict between the first target and the second target, and when there is a conflict between the first target and the second target, then the CM is configured to, based on one or more predefined criteria,
 determine and apply a parameter value of said at least one parameter, and
 determine and allocate a recuperation power or a parameter split ratio, such that the applied parameter value is different from the requested parameter value and/or the allocated recuperation power or parameter split ratio is different from the desired recuperation power or parameter split ratio.

Thus, the vehicle control unit, VCU, is allowed to send to the control module, CM, a first parameter request (for example a desired torque, power and/or wheel speed) and a desired parameter split ratio (or a desired recuperation power). The desired parameter split ratio (or desired recuperation power) does not need to be followed exactly by the CM. It is intended to instead give an idea of how the resources should be used, if realizable. For instance, in exemplary embodiments in which power regeneration is an option, the desired parameter split or desired recuperation power may give an idea of how much regenerative braking is desired, if it is realizable. The final allocation between the actuators at the wheel is done at the wheel level by the CM, where an optimization may be based on multiple conflicting error terms (e.g. the error between parameter request and actual parameter value; the error between regenerative braking ratio request and actual regenerative braking ratio; etc). By cascading the optimisation problem, the task of the VCU becomes much simpler as it does not need to consider the two actuators as separate actuators at each wheel.

Thus, when there is a conflict between the first target and the second target, the CM may apply said different parameter value and allocate said different recuperation power or parameter split ratio, such that the combined result of the applied parameter value and the allocated recuperation power or parameter split ratio satisfies the first and second targets as closely as possible based on said one or more predefined criteria.

From the explanation above it may be understood that the first target is a target for what the wheel should desirably be subjected to, while the second target is a target for the actuators.

It should be understood that the general inventive concept may be implemented for propulsion mode, as well as for braking mode. For instance, it may be implemented in systems in which power recuperation/energy regeneration is desirable, in which case one of the torque actuators may be a regenerative torque actuator. However, the general inventive concept may also be implemented in cases in which none of the actuators are regenerative actuators. For instance, one of the torque actuators may be an internal combustion engine and the other torque actuator may be an electric machine (which in this case is not implemented with a generator function), or both torque actuators may be embodied as electric machines with different properties, wherein the VCU may desire a certain parameter split ratio (such as torque split ratio or power split ratio) between the two actuators. For instance, the VCU may desire that a certain percentage of the total torque for providing a propelling force should be allocated to one of the torque actuators and the remaining percentage to the other torque actuator.

As mentioned above, in exemplary embodiments in which one of the torque actuators is a regenerative torque actuator, it may suitably be used to recuperate power. The regenerative torque actuator may for example be an electric machine, functioning as an electric motor/generator. Depending on how much regenerative braking that is desired (for instance, depending on a charge level of a connected battery), the VCU may send a desired parameter split ratio to the CM (e.g. how much of the braking torque is desirably allocated to the regenerative torque actuator for recovering braking energy). Alternatively, the VCU may send a desired recuperation power, for corresponding purpose (i.e. for instance depending on charge level of a battery), and the CM may decide how much power is to be recuperated by the regenerative torque actuator.

From the explanations above it should thus be understood that although the general inventive concept may advantageously be used for controlling regenerative braking, it may also be used in propulsion mode. In embodiments in which one of the torque actuators is a regenerative actuator, the desired recuperation power may be set to zero by the VCU in propulsion mode. Thus, according to at least one exemplary embodiment, the system is a system for controlling regenerative braking of a wheel of a vehicle provided with said at least two torque actuators.

As mentioned above, the first target, which is in the form of a requested parameter value of at least one parameter, may be a target torque, target power or a target wheel speed, or it may even be a combination of target torque or power and target wheel speed. Thus, the "at least one parameter" may be one, two or even more parameters. These different alternatives are reflected in the following exemplary embodiment.

According to at least one exemplary embodiment,
said at least one parameter is torque or power, wherein the requested parameter value is a requested torque or power to be applied to the wheel, or
said at least one parameter is wheel speed, wherein the requested parameter value is a requested rotational speed of the wheel, or
said at least one parameter includes at least two parameters, one parameter being torque or power, another parameter being wheel speed, wherein the first signal contains the first target in the form of a requested torque or power to be applied to the wheel and a requested rotational speed of the wheel.

Thus, the VCU may desire a certain change of vehicle speed, for instance, a reduction of speed, and may therefore send a torque or power request and/or a wheel speed request (each of which having the intention to provide a force to the wheel to change the vehicle speed). By combining such a request from the VCU with the second target (desired parameter split ratio and/or desired power recuperation) and letting the CM do the final allocation, an effective control of vehicle speed and/or regeneration of energy is obtainable. It should be understood that although the term "torque actuator" is has been used in this disclosure, it does not exclude that the VCU and/or the CM uses another control parameter, such as power. For instance, if the control parameter is power, and a certain power value is applied or is requested to be applied, then this will, in practice be achieved by providing a torque to the wheel.

It should be understood that the CM may be a wheel end module or an axle control module. In other words, in the case of a wheel end module, the CM will perform its controlling operations on a wheel level. In the case of the CM being an axle control module, it will perform its controlling operations on an axle level, and may thus control torque actuators associated with for example two wheels.

The VCU may desire different parameter split ratios or recuperation power in different situations. For instance, if the recuperated power of a regenerative torque actuator is used for charging a battery, and the battery is already fully charged then the VCU will normally not desire any recuperation power, and may desire that all torque is allocated to a non-regenerative torque actuator such as a service brake. However, it the battery is depleted or partly depleted, then the VCU may desire a certain torque split ratio or a certain recuperation power, so that regenerative braking energy may be used to charge the battery. According to the present disclosure, however, it is the CM which based on one or more predefined criteria, will determine the allocation of the recuperation power or torque split ratio.

Thus, as already mentioned, the parameter split ratio may be a torque split ratio or a power split ratio. In the case of regenerating energy, the parameter split ratio may suitably be in the form of a torque split ratio.

According to at least one exemplary embodiment, said predefined criteria includes a function, such as a cost function, wherein the CM is configured to minimize said function. By including such a function in said one or more predefined criteria, the CM may apply a parameter value and allocate a recuperation power which as closely as possible approximates conflicting first and second targets of the VCU.

According to at least one exemplary embodiment, said function includes the summation of at least a first function part and a second function part,
the first function part comparing the applied parameter value with the requested parameter value,
the second function part comparing the allocated recuperation power or parameter split ratio with the desired recuperation power or parameter split ratio, wherein the CM is configured to determine said parameter value and determine said recuperation power or parameter split ratio such that the result of the summation is minimized.

Again, by including such a function, the CM may take its decision such that the combined result of the two function parts satisfies the first and second targets as closely as possible. The operation of the CM may be an iterative process, in which the CM tries to find the best balance between the applied parameter value and the allocated recuperation power or parameter split ratio.

According to at least one exemplary embodiment, said function includes at least one weight factor providing an order of priority between the first target and the second target. This may be advantageous since in different situations the first and the second target may have different priorities. For instance, in the previous exemplified case of a regenerative torque actuator connected to a battery, then if a battery charge level is low, the second target (recuperation power/torque split) may have a higher weight factor than the first target. In other cases, e.g. when brake torque precision is needed, the weight factor for the first target may be increased. The one or more weight factors may suitably be provided by the VCU. Thus, in the case of the function having the above mentioned first function part and second function part, the second part would get more weight than the first function part.

Thus, in general terms, a function J, may in some exemplary embodiments be formulated as:

$$J = W_1(X_{appl} - X_{req})^2 + W_2(P_{alloc} - P_{des})^2$$

where $X_{appl}$ is the applied parameter value, $X_{req}$ is the requested parameter value, $P_{alloc}$ is the allocated recuperation power, $P_{des}$ is the desired recuperation power, $W_1$ is the weight factor for first target (i.e. the requested parameter value) and $W_2$ is the weight factor for the second target (i.e. the desired recuperation power).

As an example, if the CM has control over both an electric machine and a friction brake, and the rotational speed of the wheel is w, then the associated power for the friction brake would be $P_{frictionbrake} = \omega * T_{frictionbrake}$ (with the braking torque $T_{frictionbrake}$ defined as negative). Thus, during braking, energy is "burnt off" from the vehicle when using friction brakes. For the electric machine, the power is $P_{emachine} = \omega * T_{emachine}$).

Similarly, in the case of the second target being expressed as a desired parameter split, such as a desired torque split, the second function part would be adapted accordingly.

In cases in which the first target includes both a torque request and a wheel speed request, the first function part may be formulated as $W_T(T_{appl} - T_{req})^2 W_\omega(\omega_{appl} - \omega_{req})^2$, where $W_T$ is the weight factor for the torque request, $T_{appl}$ is the applied torque, $T_{req}$ is the requested torque, $W_\omega$ is the weight factor for the speed request, $\omega_{appl}$ is the applied rotational speed of the wheel and $\omega_{req}$ is the requested rotational speed. For the first target, similar function parts may be formulated for a power request instead of, or in addition to, a torque request.

As indicated previously in this disclosure, according to at least one exemplary embodiment, the regenerative torque actuator is an electric machine, wherein the other torque actuator is a friction brake.

According to at least one exemplary embodiment, the system comprises two or more control modules, CMs, wherein each CM is configured to control the torque actuators for a single wheel or torque actuators for a group of wheels provided on a common axle. By having each wheel or each group of wheels associated with a CM, the VCU may send first and second targets to each CM, and then each CM may decide the final allocation of torques, powers, etc., for the torque actuators of the respective wheel or group of wheels. The VCU may send the same first and second targets to each CM or it may send different first and second targets to different CMs. Each CM may suitably make individual decisions on the application of the parameter value and the allocation of power recuperation/torque split to the two or more actuators operatively connected to the wheel, or group of wheels, with which the CM is associated.

Each one of the VCU and the one or more CMs may include a microprocessor, microcontroller, programmable digital signal processor or another programmable device. Each one of the VCU and the one or more CMs may also, or instead, include an application specific integrated circuit, a programmable gate array or programmable array logic, a programmable logic device, or a digital signal processor. Where it includes a programmable device such as the microprocessor, microcontroller or programmable digital signal processor mentioned above, the processor may further include computer executable code that controls operation of the programmable device.

According to a second aspect of the present disclosure, there is provided a vehicle comprising a system of the first aspect, including any embodiment thereof. The advantages of the vehicle of the second aspect are largely analogous to the advantages of the system of the first aspect, including any embodiment thereof.

According to a third aspect of the present disclosure, there is provided a method of controlling a wheel of a vehicle provided with at least two torque actuators for providing a torque to the wheel, the method comprising:
  receiving a first signal containing a first target in the form of a requested parameter value of at least one parameter to be controlled by means of the torque actuators with respect to the wheel,
  receiving a second signal containing a second target in the form of a desired recuperation power or in the form of a desired parameter split ratio between the torque actuators,
  determining if there is a conflict between the first target and the second target, and when there is a conflict between the first target and the second target, then based on one or more predefined criteria,
  determining and applying a parameter value of said at least one parameter, and
  determining and allocating a recuperation power or a parameter split ratio, such that the applied parameter value is different from the requested parameter value and/or the allocated recuperation power or parameter split ratio is different from the desired recuperation power or parameter split ratio.

The advantages of the method according to the third aspect largely correspond to those of the system according to the first aspect and the vehicle according to the second aspect. Some exemplary embodiments of the method are listed below.

According to at least one exemplary embodiment,
  said at least one parameter is torque or power, wherein the requested parameter value is a requested torque or power to be applied to the wheel, or
  said at least one parameter is wheel speed, wherein the requested parameter value is a requested rotational speed of the wheel, or
  said at least one parameter includes at least two parameters, one parameter being torque or power, another parameter being wheel speed, wherein the first signal contains the first target in the form of a requested torque or power to be applied to the wheel and a requested rotational speed of the wheel.

According to at least one exemplary embodiment, said predefined criteria includes a function, such as a cost function, wherein the CM is configured to minimize said function.

According to at least one exemplary embodiment, said function includes the summation of at least a first function part and a second function part,
  the first function part comparing the applied parameter value with the requested parameter value,
  the second function part comparing the allocated recuperation power or parameter split ratio with the desired recuperation power or parameter split ratio, wherein the method further comprises determining said parameter value and determining said recuperation power or parameter split ratio such that the result of the summation is minimized.

According to at least one exemplary embodiment, said function includes at least one weight factor providing an order of priority between the first target and the second target.

According to at least on exemplary embodiment, at least one of the torque actuators is a regenerative torque actuator.

According to at least one exemplary embodiment, said regenerative torque actuator is an electric machine, wherein the other torque actuator is a friction brake.

According to at least one exemplary embodiment, said parameter split ratio is a torque split ratio or a power split ratio.

According to at least one exemplary embodiment, the method is a method for controlling regenerative braking of a wheel of a vehicle provided with said at least two torque actuators.

According to a fourth aspect of the present disclosure, there is provided a computer program comprising program code means for performing the method according to the third aspect, including any embodiments thereof, when said program is run on a computer. The advantages of the computer program of the fourth aspect largely correspond to those of the other aspects, including any embodiments thereof.

According to a fifth aspect of the present disclosure, there is provided a computer readable medium carrying a computer program comprising program code means for performing the method according to the third aspect, including any embodiments thereof, when said program product is run on a computer. The advantages of the computer readable medium of the fifth aspect largely correspond to the advantages of the other aspects, including any embodiments thereof.

According to a sixth aspect of the present disclosure, there is provided a control module for controlling regenerative braking of a wheel of a vehicle provided with at least two torque actuators for providing a torque to the wheel, at least one of said torque actuators being a regenerative torque actuator, the control unit being configured to perform the method according the third aspect, including any embodiments thereof. The advantages of the control module of the sixth aspect largely correspond to the advantages of the other aspects, including any embodiments thereof.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

The invention will now be described more fully hereinafter with reference to the accompanying drawings, in which certain aspects of the invention are shown. The invention may, however, be embodied in many different forms and should not be construed as limited to the embodiments and aspects set forth herein; rather, the embodiments are provided by way of example so that this disclosure will be thorough and complete, and will fully convey the scope of the invention to those skilled in the art. Accordingly, it is to be understood that the present invention is not limited to the embodiments described herein and illustrated in the drawings; rather, the skilled person will recognize that many changes and modifications may be made within the scope of the appended claims. Like reference numerals refer to like elements throughout the description.

Figure 1:
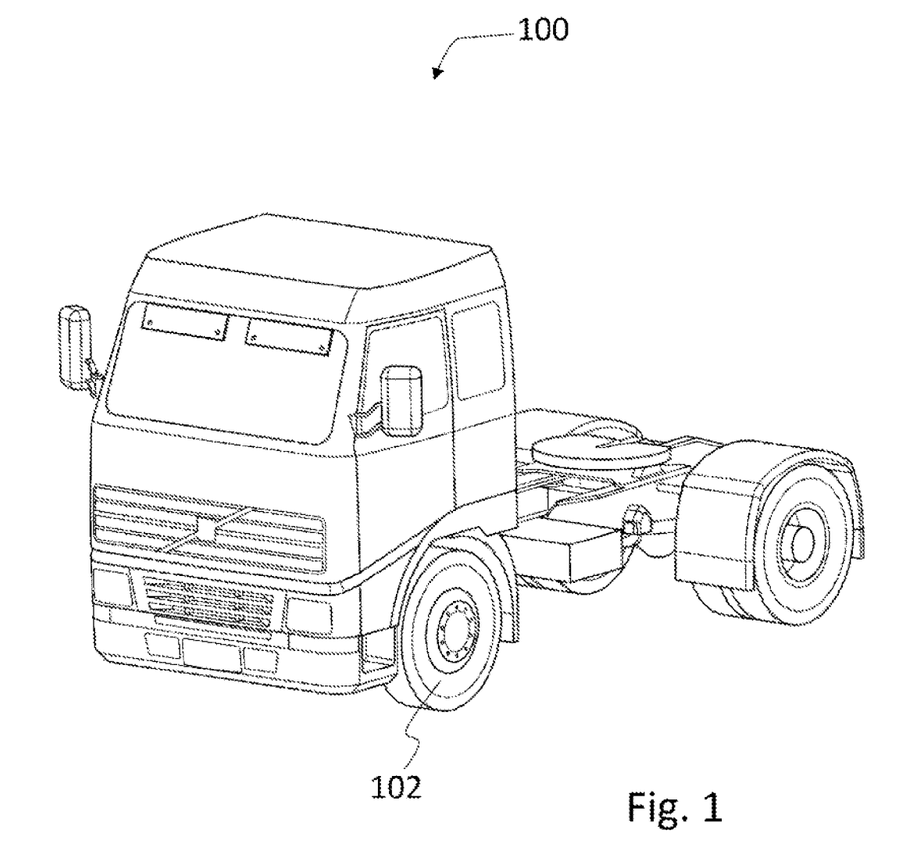
FIG. 1 illustrates a vehicle according to at least one exemplary embodiment of the invention.

FIG. 1 illustrates a vehicle 100 according to at least one exemplary embodiment of the invention. The exemplary illustration in FIG. 1 shows a tractor unit for towing a trailer unit (not shown), which together make up a semitrailer vehicle. However, the invention is applicable to other types of vehicles as well. For instance, the vehicle may be a different type of vehicle for cargo transport, such as a truck, or a truck with a dolly unit arranged to tow a trailer unit, etc. It should furthermore be understood that the inventive concept is not limited to heavy duty vehicles, but may also be implemented in other vehicles, such as cars. The vehicle 100 may be driver-operated or autonomous.

The illustrated vehicle 100 is supported on wheels 102, some of which are driven wheels. Although the vehicle 100 in FIG. 1 only has two axles carrying wheels 102, the inventive concept is applicable to vehicles having more wheels, such as in the above-mentioned different types of vehicles.

Each wheel 102, or each group of wheels, may be associated with at least two torque actuators. In some exemplary embodiments, at least one of the torque actuators may be a regenerative torque actuator. An example of a torque actuator may be a wheel brake. A wheel brake may, e.g. be a pneumatically actuated disc brake or drum brake. A wheel brake may, however, also be a regenerative brake which produces electrical power during vehicle retardation. Another example of a regenerative torque actuator is an electrical machine which is able to slow down wheel rotational velocity upon request.

The at least two torque actuators are controlled by a control module (CM), which may control applied braking force on at least one wheel 102 of a vehicle such as the vehicle 100 in FIG. 1. If the control module is axle control module, it may be configured to control torque actuators associated with a group of wheels, such as one wheel at each end of an axle. As will be discussed in connection with FIG. 2 and FIG. 3, each CM is communicatively coupled to a vehicle control unit (VCU), allowing the VCU to communicate with the CM and thereby provide instructions on vehicle braking. This VCU may potentially comprise a number of sub-units distributed across the vehicle 100, or it may be a single physical unit.

Each driven wheel 102 may be driven by a suitable electrical machine (such as an electrical motor, a combined motor/generator, etc.) The electrical machine may drive more than one wheel, e.g. working across an open differential. In other exemplary embodiments, each driven wheel may be propelled by an individually associated electrical machine. In either case, the above-mentioned VCU may suitably send requests for allocating the propulsion force between wheels. Furthermore, in some exemplary embodiment a propulsion force to a wheel may be provided by more than one actuator, for example, there may be provided two electric machines for providing a propulsion force to a wheel.

Figure 2:
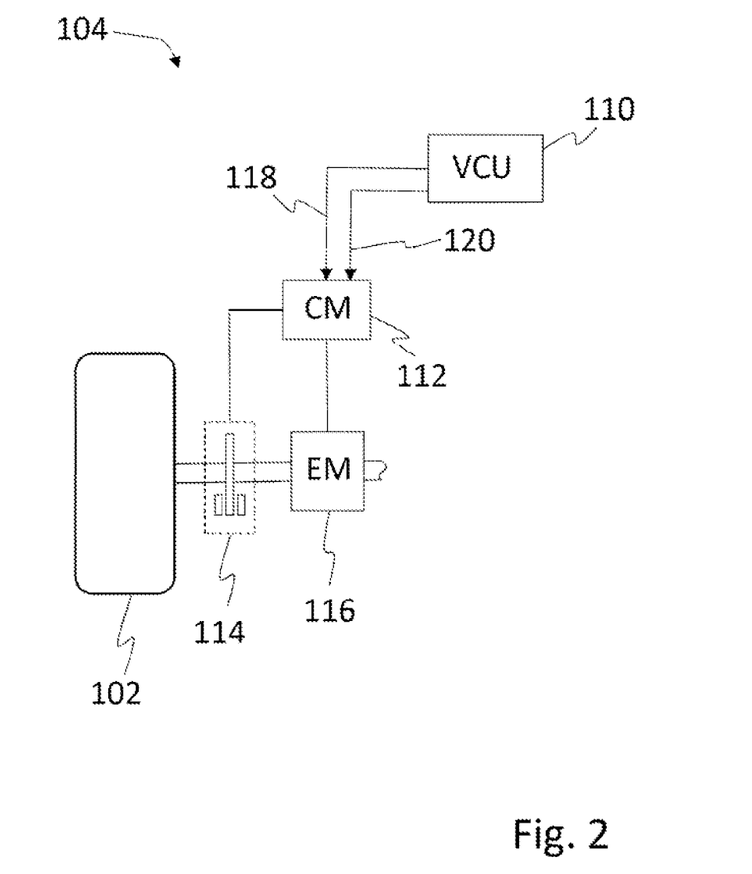
FIG. 2 illustrates a system according to at least one exemplary embodiment of the invention.

FIG. 2 illustrates a system 104 according to at least one exemplary embodiment of the invention. More specifically, there is illustrated a system 104 for controlling a wheel 102 of a vehicle, here exemplified by the vehicle front axle left wheel. A control module (CM) 112 is arranged to control the wheel braking by a first torque actuator 114, such as a brake actuator 114, i.e. a part of the brake system, here exemplified by a disc brake. The brake system may also comprise one or more electrical machines (EM) 116, and/or combinations of different brake actuators. The illustrated EM 116 may also be controlled to provide a propulsion force to the wheel 102 and suitably also for regenerating brake energy which may for instance be used for charging a battery (not shown in FIG. 2). The EM 116 may thus represent a second torque actuator 116, more specifically in the form of a regenerative torque actuator 116. Although the CM 112 has been illustrated as a wheel end module, in other exemplary embodiments, it may be embodied as an axle control module.

The CM 112 is communicatively coupled to a vehicle control unit (VCU) 110, which may form part of or act as a vehicle motion management system. Although the CM 112 and the VCU 110 have been illustrated as two functionally separate entities, it should be understood that they may be structurally provided as one common entity. Thus, in some exemplary embodiments the CM 112 and the VCU 110 are provided as one unit. In other exemplary embodiments, the CM 112 and the VCU 110 may be structurally separated. It should also be understood that the VCU 110 may be distributed over several structural entities, some of which may be remote from the vehicle, e.g. off-board. For instance, some functionalities, such as calculations made by the VCU 110 may be cloud-based, wherein part of the VCU 110 may be provided at one or more remote servers, etc.

The VCU 110 is configured to send to the CM 112 a first signal 118 containing a first target. The first target is in the form of a requested parameter value of at least one parameter to be controlled by means of the torque actuators 114, 116 with respect to the wheel 102. The at least one parameter value may, for instance, be a requested torque, a requested power or a requested wheel speed. However, in some exemplary embodiments the first target may be in the form of two or more requested parameter values. For instance, the first signal 118 may contain information about a requested torque as well as a requested wheel speed.

The VCU 110 is also configured to send to the CM 112 a second signal 120 containing a second target. The second target may be in the form of a desired recuperation power or in the form of a desired parameter split ratio between the torque actuators. Both alternatives may be used for a desired regeneration of brake energy, for example, to charge a battery. For instance, in the case of the parameter split ratio alternative, if much energy is desired to be regenerated, then the VCU 110 may suggest that the parameter split (suitably in the form of a torque split) is such that the EM 116 provides more torque than in other cases when no regeneration, or less regeneration, is desired.

The CM 112, which receives the first signal 118 and the second signal 120 from the VCU 110, determines if there is a conflict between the first target and the second target. When the CM 112 has determined that there is a conflict between the first target and the second target, then the CM 112 is configured to, based on one or more predefined criteria, determine and apply a parameter value of said at least one parameter, and determine and allocate a recuperation power or a parameter split ratio, such that the applied parameter value is different from the requested parameter value and/or the allocated recuperation power or parameter split ratio is different from the desired recuperation power or parameter split ratio.

Thus, the CM 112 may strive for applying a parameter value and to allocate a recuperation power/parameter split ratio in such way that the combined result satisfies the first and second targets as closely as possible based on the one or more predefined criteria.

As explained previously in this disclosure, the predefined criteria may include a function, such as a cost function. In such case the CM 112 may be configured to minimize said function. The function may, for instance, include the summation of two or more function parts. A first function part may compare the applied parameter value (e.g. applied torque and/or speed) with the requested parameter value. A second function part may compare the allocated recuperation power or parameter split ratio with the desired recuperation power or parameter split ratio. The CM 112 may then calculate, for instance, through an iterative process, what values should be applied for the result of the summation to be minimized. In other words, the CM 112 may intend to find a good balance between applied parameter (e.g. torque) and regeneration. The function may suitably include at least one weight factor providing an order of priority between the first target and the second target. The weight factor may suitably be provided by the VCU 110, and may for instance be sent in the first signal 118 and/or in the second signal 120, or in one or more separate signals.

Figure 3:
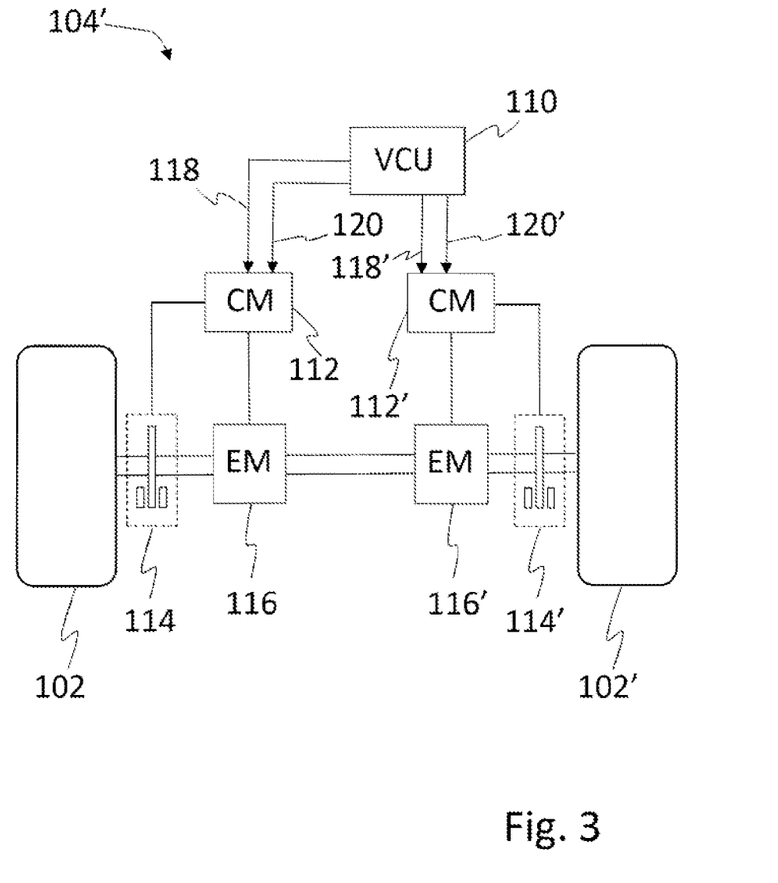
FIG. 3 also illustrates a system according to at least one exemplary embodiment of the invention.

In the exemplary illustration in FIG. 2, the VCU 110 may suitably desire a certain torque split ratio in a braking mode. However, it should be understood that in other exemplary embodiments, the parameter split ratio may suitably be a power split ratio. For instance, in some exemplary embodiments, there may be two or more actuators for providing a propulsion force to the wheel 102. As an example, there may be provided an additional electric machine for providing a propulsion force to the same wheel. The VCU 110 may thus in the first signal 118, for instance, send a first target requesting a certain power to be applied to the wheel 102, and in the second signal 120 send a second target which comprises a desired power split between the two electric machines. A similar propulsion mode may, of course, be to have a first target requesting a certain torque to the wheel and a second target with a desired torque split ratio between two electric machines. Thus, it should be understood that the general inventive concept may be implemented in braking mode, as well as in propulsion mode, and that at least one of the two torque actuators may in at least some exemplary embodiments be a regenerative torque actuator. FIG. 3 also illustrates a system 104' according to at least one exemplary embodiment of the invention. In the illustrated example, there is provided two torque actuators 114', 116' also at the right wheel 102'. Similarly, to the torque actuators 114, 116 associated with the left wheel 102, one of the torque actuators 116' is a regenerative torque actuator 116', such as an electric machine 116', and the other torque actuator 114' may be a wheel brake, such as a friction brake. A second control module CM 112' is provided to control the torque actuators 114', 116' associated with the right wheel 102'. The VCU 110 sends a first signal 118' and a second signal 120' to the second CM 112', and these signals 118', 120' may contain the same or different targets as the first and second signals 118, 120 sent to the other CM 112 that controls the left wheel torque actuators 114, 116. Both CMs 112, 112' in the illustrated exemplary embodiment of FIG. 3 may function in the corresponding way as already discussed in connection with FIG. 2 and the CM 112 disclosed therein.

It should be understood, that similar setups may be provided for other axles and wheels of the vehicle. Thus, in a general sense, in at least some exemplary embodiments, the system 114' comprises two or more control modules (CMs) 112, 112', wherein each CM 112, 112' is configured to control the torque actuators 114, 116; 114', 116' for a single wheel 102, 102' (or in case of an axle control module, for a group of wheels provided on a common axle).

From the discussion of FIGS. 2 and 3 above, it should be understood that embodiments of the system 104, 104' may suitably be used for controlling regenerative braking of a wheel 102, 102' of a vehicle provided with said at least two torque actuators 114, 116; 114', 116'. It should also be understood that the system of the present disclosure, including any embodiments of the system, simplifies the task of the VCU 110, as the final decision making is cascaded to the respective CM 112, 112'.

Figure 4:
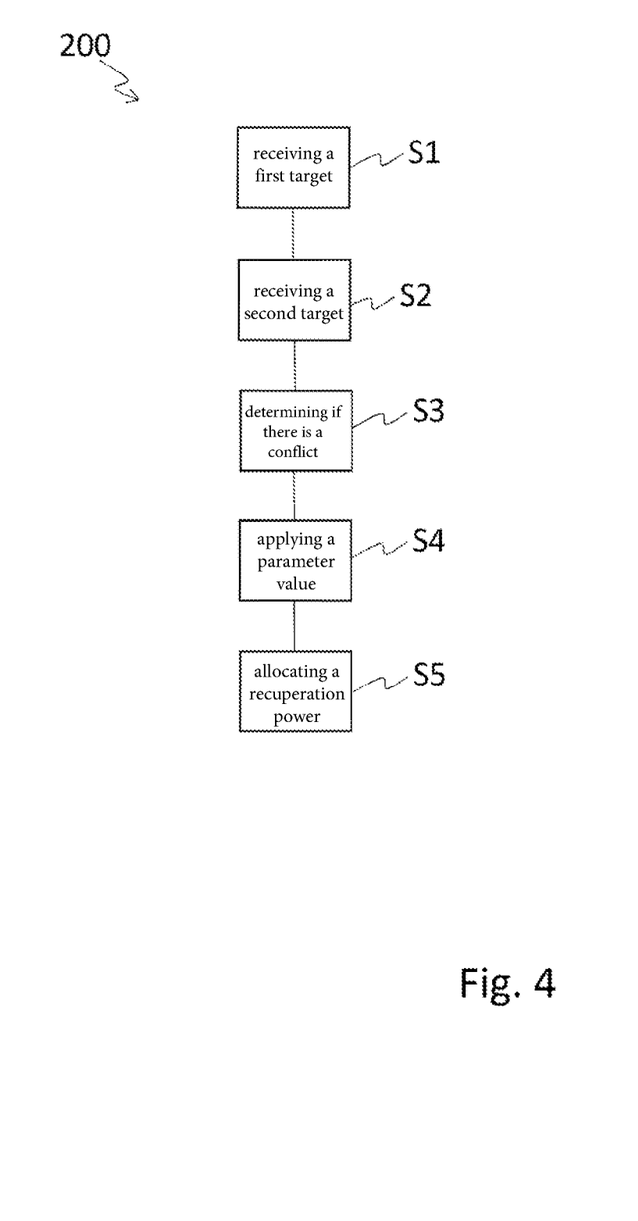
FIG. 4 schematically illustrates a method according to an exemplary embodiment of the invention.

FIG. 4 schematically illustrates a method 200 according to an exemplary embodiment of the invention. More specifically, FIG. 4 illustrates an exemplary embodiment of a method 200 for controlling a wheel of a vehicle provided with at least two torque actuators for providing a torque to the wheel, the method comprising:

in a step S1, receiving a first signal containing a first target in the form of a requested parameter value of at least one parameter to be controlled by means of the torque actuators with respect to the wheel, in a step S2, receiving a second signal containing a second target in the form of a desired recuperation power or in the form of a desired parameter split ratio between the torque actuators, in a step S3, determining if there is a conflict between the first target and the second target, and when there is a conflict between the first target and the second target, then based on one or more predefined criteria, in a step S4 determining and applying a parameter value of said at least one parameter, and in a step S5, determining and allocating a recuperation power or a parameter split ratio, such that the applied parameter value is different from the requested parameter value and/or the allocated recuperation power or parameter split ratio is different from the desired recuperation power or parameter split ratio.

It should be understood that the order of the steps may be different than the one listed above. For instance, step S1 may be performed before, simultaneously with, or after step S2. Likewise, step S4 may be performed before, simultaneously with, or after step S5.

According to at least one exemplary embodiment, the steps S4 and S5 may include determining said parameter value and determining said recuperation power or parameter split ratio such that the result of a summation of at least two function parts of a function is minimized. The function may thus be comprised in said one or more predefined criteria. The function parts may, for instance, be formulated as discussed previously in this disclosure. The method may suitably be for controlling regenerative braking, although the method may also be used in a propulsion mode.

Figure 5:
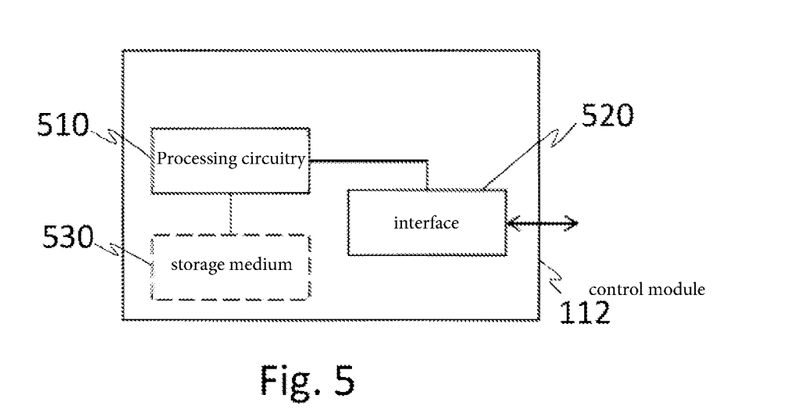
FIG. 5 schematically illustrates a control unit according to at least one exemplary embodiment of the invention.

FIG. 5 schematically illustrates a control module (CM) 112 according to at least one exemplary embodiment of the invention. In particular, FIG. 5 illustrates, in terms of a number of functional units, the components of a control module (CM) 112 according to exemplary embodiments of the discussions herein. The CM 112 may be comprised in the vehicle 100, such as illustrated schematically in FIGS. 2 and 3. Processing circuitry 510 may be provided using any combination of one or more of a suitable central processing unit CPU, multiprocessor, microcontroller, digital signal processor DSP, etc., capable of executing software instructions stored in a computer program product, e.g. in the form of a storage medium 530. The processing circuitry 510 may further be provided as at least one application specific integrated circuit ASIC, or field programmable gate array FPGA.

Particularly, the processing circuitry 510 is configured to cause the CM 112 to perform a set of operations, or steps, such as the method discussed in connection to FIG. 4. For example, the storage medium 530 may store the set of operations, and the processing circuitry 510 may be configured to retrieve the set of operations from the storage medium 530 to cause the CM 112 to perform the set of operations. The set of operations may be provided as a set of executable instructions. Thus, the processing circuitry 510 is thereby arranged to execute exemplary methods as herein disclosed.

The storage medium 530 may also comprise persistent storage, which, for example may be any single one or combination of magnetic memory, optical memory, solid state memory or even remotely mounted memory.

The CM 112 may further comprise an interface 520 for communications with at least one external device such as the VCU and the torque actuators. As such, the interface 520 may comprise one or more transmitters and receivers, comprising analogue and digital components and a suitable number of ports for wireline or wireless communication.

The processing circuitry 510 controls the general operation of the CM 112, e.g. by sending data and control signals to the interface 520 and the storage medium 530, by receiving data and reports from the interface 520, and by retrieving data and instructions form the storage medium 530. Other components, as well as the related functionality, of the CM 112 are omitted in order not to obscure the concepts presented herein.

Thus, with reference also to the previously discussed figures, FIG. 5 shows an exemplary control module 112 for controlling regenerative braking of a wheel 102, 102' of a vehicle provided with at least two torque actuators 114, 116, 114', 116, at least one of said torque actuators being a regenerative torque actuator, the control module 112 being configured to perform the steps of the method of FIG. 4, including any embodiments thereof.

Figure 6:
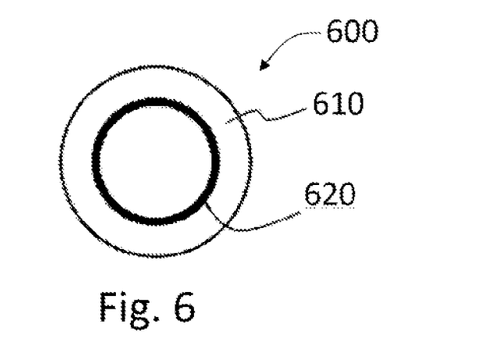
FIG. 6 schematically illustrates a computer program product according to at least one exemplary embodiment of the invention.

FIG. 6 schematically illustrates a computer program product 600 according to at least one exemplary embodiment of the invention. More specifically, FIG. 6 illustrates a computer readable medium 610 carrying a computer program comprising program code means 620 for performing the methods exemplified in FIG. 4, when said program product is run on a computer. The computer readable medium 610 and the program code means 620 may together form the computer program product 600.

The invention claimed is:

1. A system for controlling a wheel of a vehicle provided with at least two torque actuators for providing a torque to the wheel, the system comprising: a vehicle control unit, VCU, and a control module, CM, configured to control the torque actuators, wherein the VCU is configured to send to the CM: a first signal containing a first target in the form of a requested parameter value of at least one parameter to be controlled by means of the torque actuators with respect to the wheel, and a second signal containing a second target in the form of a desired recuperation power or in the form of a desired parameter split ratio between the torque actuators, wherein the CM is configured to: determine if there is a conflict between the first target and the second target, and when there is a conflict between the first target and the second target, then the CM is configured to, based on one or more predefined criteria, determine and apply a parameter value of said at least one parameter, and determine and allocate a recuperation power or a parameter split ratio, such that the applied parameter value is different from the requested parameter value and/or the allocated recuperation power or parameter split ratio is different from the desired recuperation power or parameter split ratio.

2. The system according to claim 1, wherein said at least one parameter is torque or power, wherein the requested parameter value is a requested torque or power to be applied to the wheel, said at least one parameter is wheel speed, wherein the requested parameter value is a requested rotational speed of the wheel, or said at least one parameter includes at least two parameters, one parameter being torque or power, another parameter being wheel speed, wherein the first signal contains the first target in the form of a requested torque or power to be applied to the wheel and a requested rotational speed of the wheel.

3. The system according to claim 1, wherein said predefined criteria includes a function, such as a cost function, wherein the CM is configured to minimize said function.

4. The system according to claim 3, wherein said function includes the summation of at least a first function part and a second function part, the first function part comparing the applied parameter value with the requested parameter value, the second function part comparing the allocated recuperation power or parameter split ratio with the desired recuperation power or parameter split ratio, wherein the CM is configured to determine said parameter value and determine said recuperation power or parameter split ratio such that the result of the summation is minimized.

5. The system according to claim 3, wherein said function includes at least one weight factor providing an order of priority between the first target and the second target.

6. The system according to claim 1, wherein at least one of the torque actuators is a regenerative torque actuator.

7. The system according to claim 6, wherein said regenerative torque actuator is an electric machine, wherein the other torque actuator is a friction brake.

8. The system according to claim 1, wherein the system is a system for controlling regenerative braking of a wheel of a vehicle provided with said at least two torque actuators.

9. The system according to claim 1, wherein said parameter split ratio is a torque split ratio or a power split ratio.

10. The system according to claim 1, comprising two or more control modules, CMs, wherein each CM is configured to control the torque actuators for a single wheel or torque actuators for a group of wheels provided on a common axle.

11. A vehicle comprising a system according to claim 1.

12. A method of controlling a wheel of a vehicle provided with at least two torque actuators for providing a torque to the wheel, the method comprising: receiving a first signal containing a first target in the form of a requested parameter value of at least one parameter to be controlled by means of the torque actuators with respect to the wheel, receiving a second signal containing a second target in the form of a desired recuperation power or in the form of a desired parameter split ratio between the torque actuators, determining if there is a conflict between the first target and the second target, and when there is a conflict between the first target and the second target, then based on one or more predefined criteria, determining and applying a parameter value of said at least one parameter, and determining and allocating a recuperation power or a parameter split ratio, such that the applied parameter value is different from the requested parameter value and/or the allocated recuperation power or parameter split ratio is different from the desired recuperation power or parameter split ratio.

13. The method according to claim 12, wherein said at least one parameter is torque or power, wherein the requested parameter value is a requested torque or power to be applied to the wheel, said at least one parameter is wheel speed, wherein the requested parameter value is a requested rotational speed of the wheel, or said at least one parameter includes at least two parameters, one parameter being torque or power, another parameter being wheel speed, wherein the first signal contains the first target in the form of a requested torque or power to be applied to the wheel and a requested rotational speed of the wheel.

14. The method according to claim 12, wherein said predefined criteria includes a function, such as a cost function, wherein the CM is configured to minimize said function.

15. The method according to claim 14, wherein said function includes the summation of at least a first function part and a second function part, the first function part comparing the applied parameter value with the requested parameter value, the second function part comparing the allocated recuperation power or parameter split ratio with the desired recuperation power or parameter split ratio, wherein the method further comprises determining said parameter value and determining said recuperation power or parameter split ratio such that the result of the summation is minimized.

16. The method according to claim 14, wherein said function includes at least one weight factor providing an order of priority between the first target and the second target.

17. The method according to claim 12, wherein at least one of the torque actuators is a regenerative torque actuator.

18. The method according to claim 17, wherein said regenerative torque actuator is an electric machine, wherein the other torque actuator is a friction brake.

19. The method according to claim 12, wherein said parameter split ratio is a torque split ratio or a power split ratio.

20. The method according to claim 12, wherein it is a method for controlling regenerative braking of a wheel of a vehicle provided with said at least two torque actuators.

21. A computer program comprising program code means for performing the steps of the method according to claim 12 when said program is run on a computer.

22. A computer readable medium carrying a computer program comprising program code means for performing the steps of the method according to claim 12 when said program product is run on a computer.

23. A control module for controlling regenerative braking of a wheel of a vehicle provided with at least two torque actuators for providing a torque to the wheel, at least one of said torque actuators being a regenerative torque actuator, the control module being configured to perform the steps of the method according to claim 12.

\* \* \* \* \*